United States Patent [19]
Haas et al.

[11] Patent Number: 5,822,876
[45] Date of Patent: Oct. 20, 1998

[54] SURFACE DISPLACEMENT MEASUREMENT GAUGE

[75] Inventors: Edwin G. Haas, Sayville; James R. Kennedy, Southampton; Alvin Levy, Stony Brook; John M. Papazian, Great Neck, all of N.Y.

[73] Assignee: Northrop Grumman Corporation, Los Angeles, Calif.

[21] Appl. No.: 637,874

[22] Filed: Apr. 25, 1996

[51] Int. Cl.[6] ....................................................... G01B 3/56
[52] U.S. Cl. ........................ 33/533; 33/532; 33/DIG. 13; 73/105; 73/783
[58] Field of Search ............................... 33/832, 833, 531, 33/532, 533, 543, 555.1, 542, DIG. 13, 530, 546, 555.4; 73/104, 105, 783

[56] References Cited

U.S. PATENT DOCUMENTS

| | | | |
|---|---|---|---|
| 2,350,073 | 5/1944 | Simmons, Jr. | 33/DIG. 13 |
| 3,541,844 | 11/1970 | Stover, III . | |
| 3,614,488 | 10/1971 | Sonderegger et al. . | |
| 3,777,558 | 12/1973 | Bain . | |
| 3,899,834 | 8/1975 | Harrison, Jr. | 33/DIG. 13 |
| 3,914,992 | 10/1975 | Babcock . | |
| 4,044,828 | 8/1977 | Jones et al. . | |
| 4,233,744 | 11/1980 | Possati . | |
| 4,248,094 | 2/1981 | Thompson et al. | 73/783 |
| 4,249,423 | 2/1981 | Viertl et al. | 73/783 |
| 4,450,811 | 5/1984 | Ichikawa . | |
| 4,776,211 | 10/1988 | Griswold, Jr. . | |
| 4,802,095 | 1/1989 | Jeppsson | 73/104 |
| 5,042,164 | 8/1991 | Eppinger . | |
| 5,121,929 | 6/1992 | Cobb . | |
| 5,207,554 | 5/1993 | Asakawa et al. | 33/DIG. 13 |
| 5,289,722 | 3/1994 | Walker et al. | 33/DIG. 13 |
| 5,631,622 | 5/1997 | Hauber et al. | 33/DIG. 13 |

FOREIGN PATENT DOCUMENTS

| | | | |
|---|---|---|---|
| 57-33301 | 2/1982 | Japan | 33/DIG. 13 |

*Primary Examiner*—Diego F.F. Gutierrez
*Assistant Examiner*—Andrew Hirshfeld
*Attorney, Agent, or Firm*—Terry J. Anderson; Karl J. Hoch, Jr.

[57] ABSTRACT

A gauge for measuring an out-of-plane surface displacement profile around a cold-worked fastener hole in relation to the distribution of residual compressive stresses around the hole and related fatigue life. The gauge has a deformable strain sensor positionable to be deformed in accord with the out-of-plane surface of the structural material circumferentially surrounding the cold-worked hole. A measurement reporting readout device is in communication with the strain sensor and relates three-dimensional surface-profile measurement data in accord with strain sensor deformation to determine or verify the cold expansion magnitude, uniformity and consequent fatigue life through three-dimensional elastoplastic finite element comparative analyses and/or experimental measurements for a hole in any material of given thickness.

13 Claims, 2 Drawing Sheets

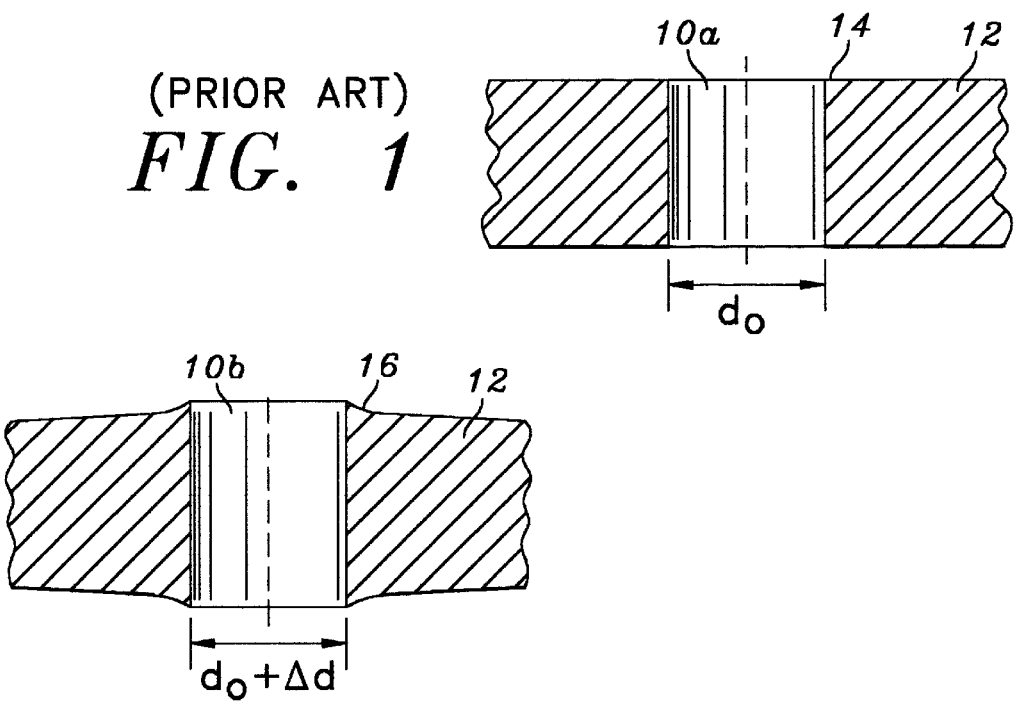
(PRIOR ART)
FIG. 1
(PRIOR ART)
FIG. 2
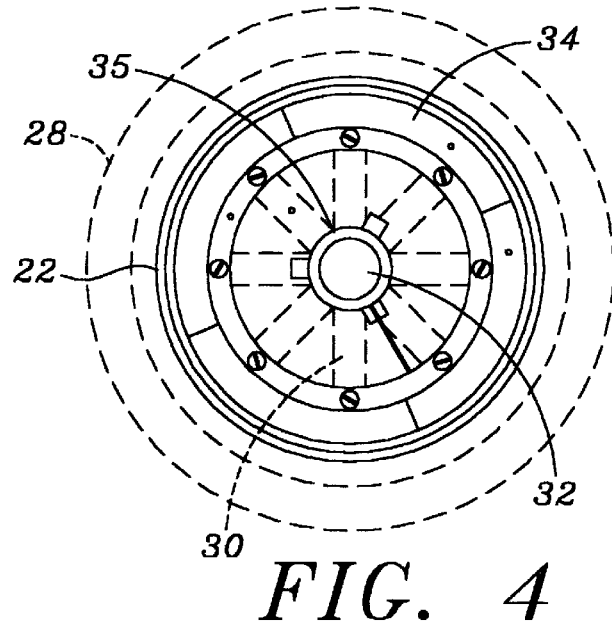
FIG. 4
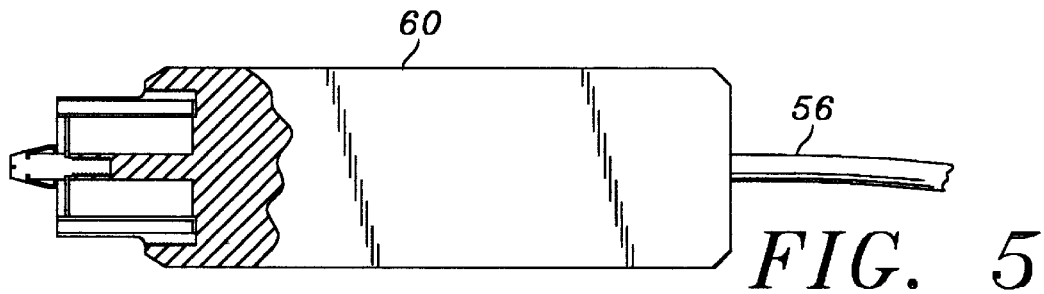
FIG. 5

SURFACE DISPLACEMENT MEASUREMENT GAUGE

FIELD OF THE INVENTION

The present invention relates to a gauge for measuring an out-of-plane surface displacement profile around a cold-worked fastener hole in relation to the distribution of residual compressive stresses around the hole and related fatigue life.

BACKGROUND OF THE INVENTION

Fatigue cracks in a load-carrying structure often start from fastener holes through the structure where fasteners are used to make connections. The fatigue life of the structure can be increased by cold-expanding a fastener hole to thereby increase residual compressive circumferential stress around the hole. Such cold working is accomplished with a special mandrel that plastically deforms material surrounding the hole while permanently increasing the diameter of the hole. The resulting upset material has an out-of-plane displacement which is a region of material with residual compressive circumferential forces that reduce peak tensile circumferential stresses due to external loading. Because of physical limitations of the mandrel, however, residual stresses are not imparted uniformly to the entire circumference of the hole. Therefore, it is necessary to quantitatively measure and thereby verify the adequacy of the cold-worked product.

Currently, cold-working measurement gauges rely upon diametral measurements which relate the increase of hole diameter to predetermined levels of cold working. The hole diameter measurements are then statistically correlated to the amount of residual stress retained and, therefore, to some level of fatigue-life enhancement. Accuracy of diametral measurement instruments can be questionable, however, because of the amount of diametral variation encountered within each measured hole and because of being less direct and more statistically oriented. Additionally, and although usable in a shop environment, the use of diametral gauges such as micrometer-type instruments can be tedious and time consuming. Alternately, the out-of-plane surface deformation is also a measure of the cold-working process and related induced compressive stresses. Current three-dimensional mapping devices employing techniques such as diamond stylus profilometry, laser-based profilometry and holographic interferometry can be used to measure out-of-plane deformation, but are generally limited to laboratory testing of samples rather than on-site or field environments which would be required by large items such as industrial machinery, airplanes and the like.

In view of the above considerations, it is apparent that a need is present for an out-of-plane surface displacement measurement gauge providing a direct measurement of displacement of structural material surrounding a cold-worked hole at on-site as well as laboratory locations. Accordingly, a primary object of the present invention is to provide a displacement measurement gauge wherein a deformable strain sensor thereof is positionable in communication with structural material surrounding a cold-worked hole and deformable in accord with the configuration of the material.

Another object of the present invention is to provide a displacement measurement gauge wherein a seating sensor thereof requires seating contact of the gauge with the structural material being measured in order to activate a measurement reporting member of the measurement gauge.

Yet another object of the present invention is to provide a displacement measurement gauge wherein a centering device projects therefrom for positioning the gauge in central alignment with the hole whose surrounding structural material is to be measured.

These and other objects of the present invention will become apparent throughout the description thereof which now follows.

SUMMARY OF THE INVENTION

The present invention is a gauge for measuring an out-of-plane surface displacement profile of out-of-plane structural material circumferentially surrounding a cold-worked hole disposed through the structural material. The gauge comprises a deformable strain sensor positionable to be deformed in accord with the out-of-plane surface of the structural material circumferentially surround the cold-worked hole during measurement of the out-of-plane displacement profile thereof. A measurement reporting member is in communication with the strain sensor and relates surface-profile measurement data in accord with strain sensor deformation. In particular, the amount of cold work achieved is determined by directly measuring the quantity of material that is displaced out of plane. Thus, the measurement reporting member preferably includes a microprocessor able to compare three-dimensional data received from the deformable strain sensor with three-dimensional elasto-plastic finite element analyses for a hole in any material of given thickness to determine or verify the cold expansion magnitude and uniformity in a cold-worked hole. Additionally, strain measurements can be compared to actual prior measurements taken from known standards and previously stored in memory. Preferred strain sensors include a plurality of ribbons of strain sensitive film, strain gauges, or other strain-sensitive material as would be recognized in the art.

The inventive gauge can have a seating sensor comprising an outer surface positionable in contact with the plane surface surrounding the hole and an inner surface positionable in contact with a pressure sensitive sensor such that the seating sensor is forced toward the pressure sensitive sensor during measurement of the out-of-plane displacement profile. The pressure-sensitive sensor is in communication with a controller that activates the measurement reporting member only upon contact of the inner surface of the seating sensor with the pressure sensitive sensor to thereby assure full gauge seating during measurement as well as reproducible measurement results.

A preferred embodiment of the gauge includes a cylindrical probe-type housing having a distal end at which displacement measurement occurs. A centering pin can project from the center of the distal end to thereby enable centering within the hole whose out-of-plane surrounding structure is being measured. A variety of sizes is provided to be used in accord with out-of-plane displacement measurements affecting various hole diameters. The present gauge has compact, yet rugged, construction enabling convenient use at on-site locations for in-process inspections of structural material surrounding fastener holes. Measurement data can provide direct correlation between out-of-plane displacements and residual stress distribution for an instant read-out of acceptance/rejection information.

BRIEF DESCRIPTION OF THE DRAWINGS

An illustrative and presently preferred embodiment of the invention is shown in the accompanying drawings in which:

FIG. 1 is a schematic side elevation view in section of a fastener hole prior to cold expansion;

FIG. 2 is a schematic side elevation view in section of the fastener hole of FIG. 1 after cold expansion;

FIG. 4 is a schematic bottom plan view along line 4—4 of FIG. 3; and

FIG. 5 is a schematic side elevation view partially in section of a probe construction embodying a measurement gauge.

DETAILED DESCRIPTION OF THE PREFERRED EMBODIMENT

Figure 3:
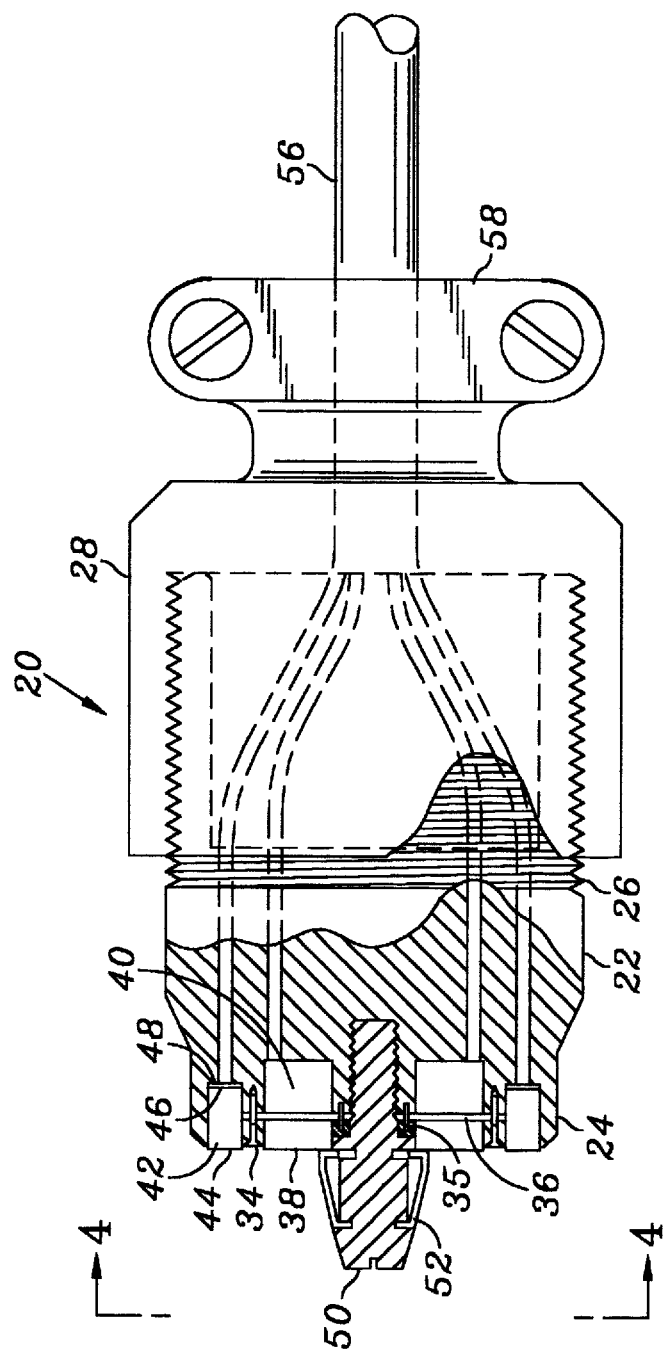
FIG. 3 is a schematic side elevation view partially in section of an out-of-plane surface displacement measurement gauge.

Referring to FIG. 1, a fastener hole 10a through a structure 12 is shown. The hole 10a has a diameter $d_o$ prior to cold-working. Its diameter is increaded to $d_o + \Delta d$ as shown in the hole 10b of FIG. 2 by cold expansion with a mandrel (not shown) as known in the art. As is illustrated in FIG. 2, after cold expansion the diameter of the fastener hole is permanently increased and the structural material 14 circumferentially surrounding the cold-worked hole 10b is upset due to the plastic deformation. Collectively, the upset material represents the region that has an out-of-plane displacement profile 16. As earlier described, the fatigue life of the structure 12 can be increased by cold-expanding fastener holes. However, it is important to verify that such expansion has the magnitude and uniformity required to achieve fatigue-life improvement. Verification can be accomplished by accurately measuring the profile 16 of the structural material 14 surrounding the fastener hole 10b and thereafter comparing the measured profile 16 to known profiles reflecting acceptable displacement profiles.

Referring to FIGS. 3 and 4, a gauge 20 for measuring an out-of-plane surface displacement profile 16 is illustrated. A cylindrical probe housing 22 contains measurement apparatus described below disposed at the distal end 24 of the housing 22, and the housing 22 has a proximal screw-thread exterior 26 for securement within a probe holder 28. Eight equidistantly-spaced deformable ribbons 30 of strain sensitive film are arranged to extend radially from a central site 32 to be fixed laterally by a retaining ring 34 and centrally by a retainer washer 35 to thereby collectively form a strain sensor constructed of a radially-segmented strain sensing layer 36. The strain sensing layer 36 is disposed between a deformable outer elastomer ring 38 and a deformable inner elastomer ring 40 for transferring displacements to the deformable strain sensing layer 36 as described later. A segmented outer ring 42 has an outer surface 44 and an inner surface 46, and is forcible inwardly from the distal end 24 of the housing 22 to come into contact with a pressure sensitive film 48 whose function is described below. A spring-loaded centering pin 50 projects distally from the center of the distal end 24 of the housing 22 for placement in a hole whose surrounding structure is being inspected to thereby center the gauge 20 there about. In particular, a spring member 52 disposed laterally about the pin 50 contacts the interior wall of a hole to thereby place the pin 50 in the center thereof and simultaneously situate the gauge 20 centrally.

Both the strain sensing layer 36 and pressure sensitive film 48 are in conventional electrical connection with a measurement reporting member (not shown) having a visible readout and/or audible signal to indicate that reading was acceptable. As used throughout, the term "acceptable" means that a proper contact was established for a measurement to occur. The connection is accomplished through a cable 56 held in place by a cable clamp 58. The reporting member includes a microprocessor capable of comparing a three-dimensional displacement profile measured by the gauge with three-dimensional finite element analyses or a prior stored data file from an acceptable profile obtained experimentally for a hole in any material of given thickness to determine or verify the amount of cold expansion and consequent fatigue life. In reference to FIG. 5, an alternative gauge construction is illustrated wherein a probe holder 60 with a cable 56 therefrom has an increased longitudinal dimension which may be required depending upon hole access characteristics.

In operation, a technician first positions the centering pin 50 of the gauge 20 within a cold-worked hole 10b whose surrounding out-of-plane surface displacement profile 16 is to be measured. Such positioning places the outer surface 44 of the segmented outer ring 42 and the outer elastomer ring 38 in contact with the out-of-plane displacement profile 16 of the structural material 14 circumferentially surrounding the hole 10b. The technician then forces the housing 24 against the structural material 14 such that the outer surface 44 of the segmented outer ring 42 contacts the structural material 14 and moves the ring 42 inwardly to cause the inner surface 46 thereof to contact the pressure sensitive film 48. The pressure sensitive film 48 is in electrical communication with a controller (not shown) within the measurement reporting member that activates the measurement reporting member only upon acceptable contact with the inner surface 46 of the ring 42. In this manner, seating of the gauge 20 is assured and displacement profile results are reproducible. Also in contact with the structural material 14 is the deformable outer elastomer ring 38 which is also in contact with both the deformable strain sensing layer 36 and the deformable inner elastomer ring 40. Specifically, the outer elastomer ring 38 is deformed in accord with the out-of-plane displacement profile 16 of the structural material 14, and this three-dimensional deformation is transferred to the inner elastomer ring 40 which simultaneously deforms the ribbons 30 comprising the strain sensing layer 36. The three-dimensional deformation profile of the strain sensing layer 36 is conveyed to the microprocessor of the measurement reporting member and is processed in relation to finite element analyses as earlier described. A readout value provided by the measurement reporting member tells the technician whether the out-of-plane displacement profile is or is not in accord with fatigue life standards.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A gauge for measuring an out-of-plane surface displacement profile of an out-of-plane surface of a structural material circumferentially surrounding a cold-worked hole disposed through the structural material, the gauge comprising:

a) a deformable strain sensor positionable to be deformed in accord with the out-of-plane surface of the structural material circumferentially surrounding the cold-worked hole during measurement of the out-of-plane surface displacement profile thereof, said strain sensor comprising at least three ribbons of strain sensitive film arranged to extend radially from a center member of the gauge and spaced substantially equidistantly from each other over a 360 degree circular distance; and b) a measurement reporting member in communication with the strain sensor.

2. A gauge for measuring an out-of-plane surface displacement profile as claimed in claim 1 wherein the strain sensor is disposed within a housing having a distal end and wherein a centering pin projects from the distal end of the housing substantially coaxially with the center member from which the strain sensitive film extends for positioning the center member in substantial axial alignment with the hole.

3. A gauge for measuring an out-of-plane surface displacement profile of an out-of-plane surface of a structural material circumferentially surrounding a cold-worked hole disposed through the structural material, the gauge comprising:

a) a generally cylindrical housing having a distal end;

b) a deformable strain sensor disposed within the housing and situated between an inner deformable member disposed within the housing and an outer deformable member disposed within the housing, wherein the outer deformable member, strain sensor and inner deformable member are in contact with each other, and wherein the outer deformable member is positionable through the distal end in contact with the out-of-plane surface to thereby deform the inner deformable member which simultaneously deforms the strain sensor in accord with the out-of-plane surface displacement profile of the out-of-plane surface; and c) a measurement reporting member in communication with the strain sensor.

4. A gauge for measuring an out-of-plane surface displacement profile as claimed in claim 3 having in addition a seating sensor having an outer surface positionable in contact with the out-of-plane surface and an inner surface positionable in contact with a pressure sensitive sensor, said seating sensor forcible toward the pressure sensitive sensor in accord with positioning the outer deformable member in contact with the out-of-plane surface, with said pressure sensitive sensor being in communication with a controller that activates the measurement reporting member only upon acceptable contact of the inner surface of the seating sensor with the pressure sensitive sensor.

5. A gauge for measuring an out-of-plane surface displacement profile as claimed in claim 4 wherein the strain sensor comprises a plurality of ribbons of strain sensitive film, arranged to extend radially from a center site and spaced substantially equidistantly from each other over a 360 degree circular distance.

6. A gauge for measuring an out-of-plane surface displacement profile as claimed in claim 5 wherein a centering pin projects from the distal end of the housing substantially coaxially with the center site from which the strain sensitive film extends for positioning said gauge relative to the center site in substantial axial alignment with the hole.

7. A gauge for measuring an out-of-plane surface displacement profile as claimed in claim 4 wherein the seating sensor is a ring member.

8. A gauge for measuring an out-of-plane surface displacement profile as claimed in claim 4 wherein a centering pin projects from the distal end of the housing substantially coaxially with a vertical central axis of the deformable strain sensor.

9. A gauge for measuring an out-of-plane surface displacement profile as claimed in claim 3 wherein the strain sensor comprises a plurality of ribbons of strain sensitive film strain gauges, arranged to extend radially from a center site and spaced substantially equidistantly from each other over a 360 degree circular distance.

10. A gauge for measuring an out-of-plane surface displacement profile as claimed in claim 9 wherein a centering pin projects from the distal end of the housing substantially coaxially with the center site from which the strain sensitive film extends for positioning the center site in substantial axial alignment with the hole.

11. A gauge for measuring an out-of-plane surface displacement profile as claimed in claim 3 wherein a centering pin projects from the distal end of the housing substantially coaxially with a vertical central axis of the deformable strain sensor.

12. A gauge for measuring an out-of-plane surface displacement profile of an out-of-plane surface of a structural material circumferentially surrounding a cold-worked hole disposed through the structural material, the gauge comprising:

a) a deformable strain sensor positionable to be deformed in accord with the out-of-plane surface of the structural material circumferentially surrounding the cold-worked hole during measurement of the out-of-plane surface displacement profile thereof, said strain sensor being centrally disposed within a cylindrical housing having a longitudinal axis and a distal end and wherein a centering pin projects from the distal end of the housing substantially coaxially with the longitudinal axis for positioning the housing in substantial axial alignment with the hole; and b) a measurement reporting member in communication with the strain sensor.

13. A gauge for measuring an out-of-plane surface displacement profile of an out-of-plane surface of a structural material circumferentially surrounding a cold-worked hole disposed through the structural material, the gauge comprising:

a) a deformable strain sensor positionable to be deformed in accord with the out-of-plane surface of the structural material circumferentially surrounding the cold-worked hole during measurement of the out-of-plane surface displacement profile thereof;

b) a measurement reporting member in communication with the strain sensor; and c) a seating sensor having an outer surface positionable in contact with the out-of-plane surface and an inner surface positionable in contact with a pressure sensitive sensor, said seating sensor forcible toward the pressure sensitive sensor during measurement of the out-of-plane displacement profile, with said pressure sensitive sensor being in communication with a controller that activates the measurement reporting member only upon acceptable contact of the inner surface of the seating sensor with the pressure sensitive sensor.

* * * * *